July 23, 1935.  G. NATHAN  2,009,145
RAY TINTING DEVICE
Filed Nov. 20, 1933  2 Sheets-Sheet 1
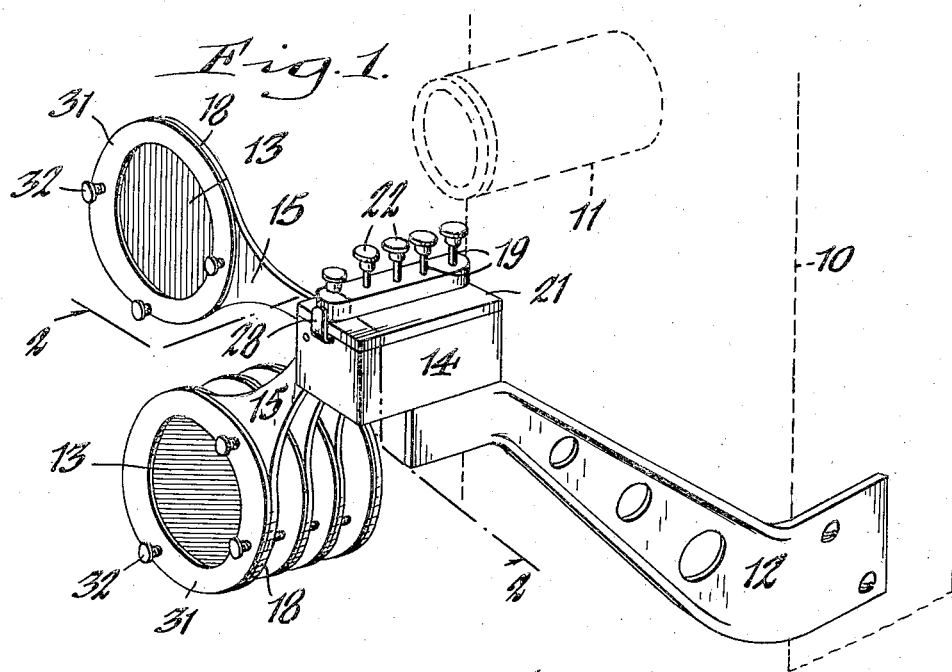
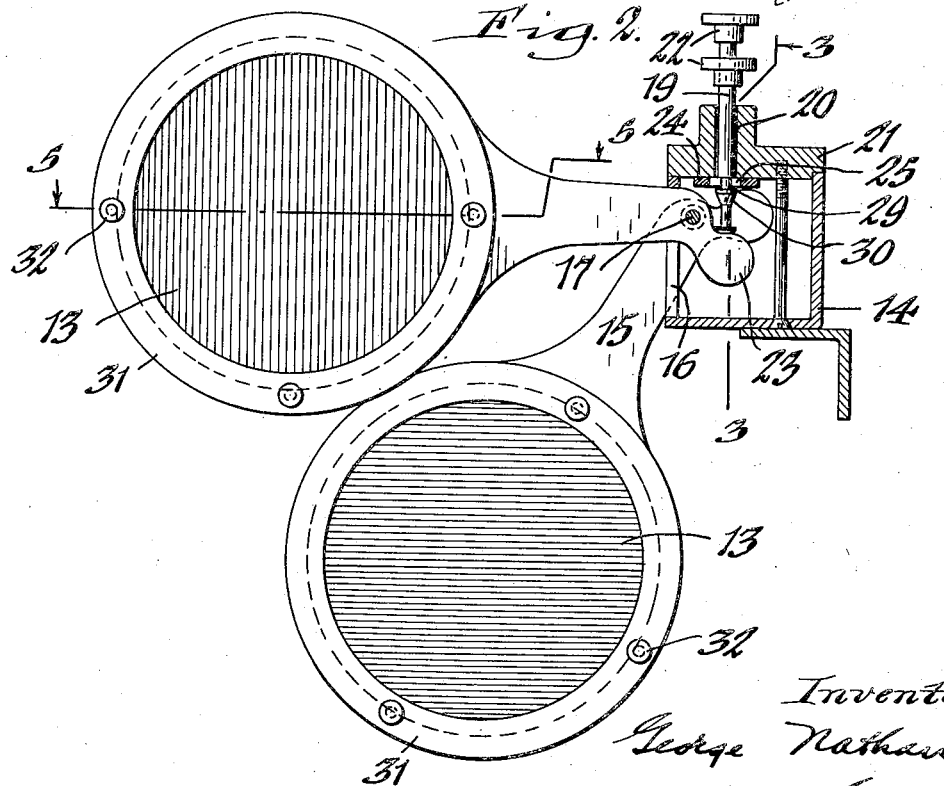
Inventor,
George Nathan
by Walter P. Geeper
Attorney.

July 23, 1935.  G. NATHAN  2,009,145
RAY TINTING DEVICE
Filed Nov. 20, 1933  2 Sheets-Sheet 2
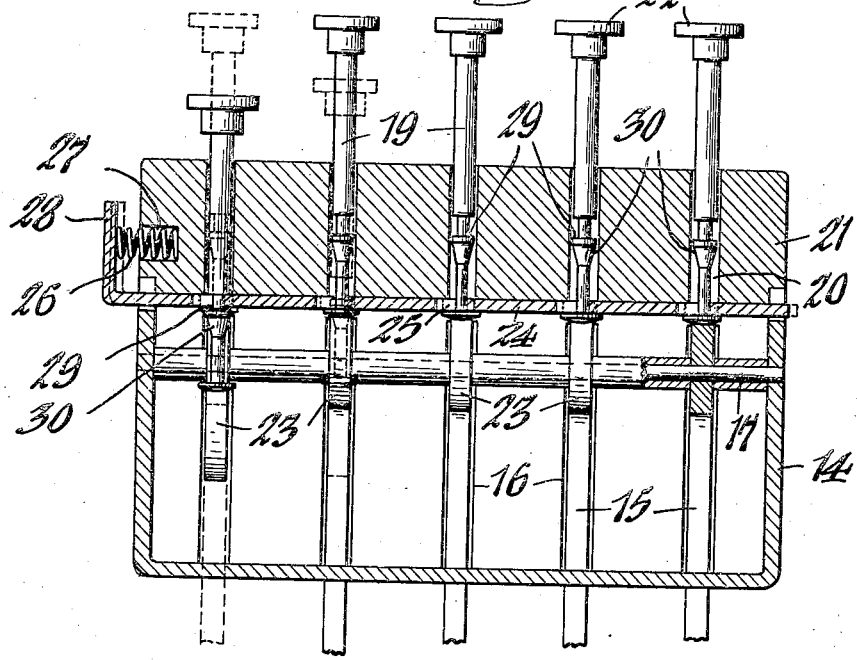
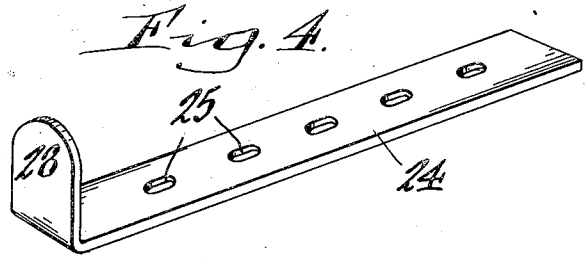
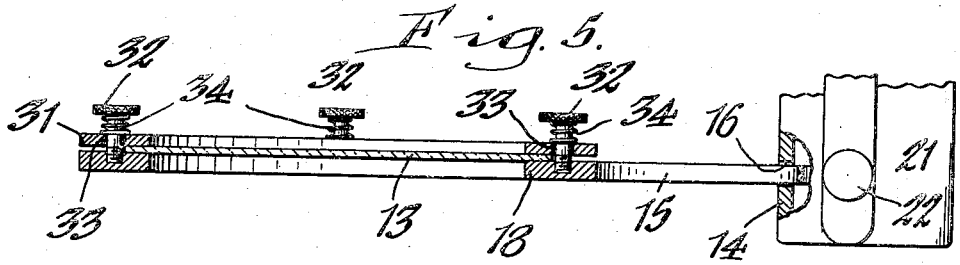

Patented July 23, 1935

2,009,145

UNITED STATES PATENT OFFICE 2,009,145

RAY TINTING DEVICE

George Nathan, Buffalo, N. Y.

Application November 20, 1933, Serial No. 698,815

6 Claims. (Cl. 240—3.1)

This invention relates to a device for use with light projection apparatus, motion picture projection machines and the like for projecting different colored light rays onto a stage, screen or the like for producing desired color effects.

One of its objects is to provide a simple, compact and efficient device of this character for selectively projecting one or another of a plurality of color screens into and out of operative position.

Another object of the invention is the provision of a ray-tinting device having positive and reliable means for effecting the selection of the color screens at the will of the operator, and further, to so design such selection means as to automatically return, when desired, a projected screen to an inoperative position simultaneously with the selection of another screen to an operative position.

Other features of the invention reside in the construction and arrangement of parts hereinafter described and particularly pointed out in the appended claims.

In the accompanying drawings:—

Figure 1 is a perspective view of the device embodying my invention. Figure 2 is an enlarged, transverse vertical section taken substantially in the plane of line 2—2, Figure 1. Figure 3 is an enlarged longitudinal section taken in the plane of line 3—3, Figure 2. Figure 4 is a detached perspective view of the shiftable latch bar of the device. Figure 5 is an enlarged cross section taken on line 5—5, Figure 2.

Similar characters of reference indicate corresponding parts throughout the several views.

By way of example, my ray-tinting device has been shown in connection with a light projection apparatus 10 including a lens-tube 11, the device being adapted to be supported from such apparatus by a bracket 12 secured thereto and so positioned that the color screens 13 of the device are adapted to be projected into and out of the projected path of light from the projection apparatus.

The color screens 13, five of which are shown in the drawings, are of different colors and are mounted for vertically swinging movement from a casing 14 attached to the bracket 12, the screens being disposed side by side in a normally pendant inoperative position out of the pathway of the light rays from the projection apparatus and being adapted to be selectively projected into an operative position in the path of the light rays. By preference, these color screens are mounted on vertically-swinging levers 15 whose inner ends extend through corresponding upright slots 16 formed in the front wall of the casing 14 and which are fulcrumed on a common horizontal pivot 17 extending through the casing adjacent the slotted wall thereof. At their outer ends, these levers terminate in ring-like frames 18 to which the color screens or gelatines 13 are detachably secured. These screen-bearing levers normally assume the pendant or downwardly inclined position shown in Figures 1 and 2 and such position may be predetermined by the levers abutting at their edge against the bottoms of the slots 16, which slots serve to guide the levers during their swinging movement into and out of operative position.

The means for selectively projecting the screen-levers 15 to an operative position preferably consist of a plurality of plunger-like elements 19 corresponding in number to the screen levers and mounted for vertical movement in guide openings 20 formed in a cover 21 for the casing 14. At their upper ends, these plungers have actuating finger-engaging knobs or buttons 22 which, for convenience, may be provided with an identification indicating the color of the particular screen which it controls, while at their lower ends these plungers abut against arms or cam-like projections 23 formed on the respective levers 15 and disposed within the casing and at the rear side of the pivot 17. These plungers are normally held in their elevated position by the screen-levers when the latter are in their pendant or inoperative position. When the plungers are depressed, the companion screen-levers are projected upwardly about the pivot 17 to an operative position in the light path of the projection apparatus.

In order to retain the projected screen levers in display position, I provide a latching means which is so designed as to not only automatically latch a selected lever, through the medium of its plunger, in an elevated or display position, but which at the same time functions to automatically release any lever or levers which were previously in display position. To this end, a horizontally shiftable latch bar 24 is provided which is preferably applied to the underside of the casing cover 21 in line with its plunger openings 20 and which has openings or slots 25 arranged in a longitudinal row and through which the lower ends of the plunger extend in the manner shown in Figures 2 and 3. This latch bar is normally held in its latched position by a spring 26 which is seated in a socket 27 formed in one end of the casing cover and which abuts against a lug 28 rising from the adjoining end of the bar, as shown in Figure 3. Adjacent its lower end, each plunger 19 is provided with a shoulder 29 which is preferably formed by an annular groove and which, in the depressed position of the plunger, is adapted to abut against the underside of the latch bar 24 adjacent one edge of the plunger-engaging opening 25 thereof, as shown in Figure 2 and also at the left hand end of Figure 3. Immediately below the locking shoulder 29, each plunger has an inclined surface or cam-portion 30 which is adapted, upon depressing the plunger to effect the selection of the companion screen lever 15, to encounter the adjoining edge of the corresponding latch bar opening 25 and effect a shifting of such bar to a released position and permit any previously depressed plungers to be elevated to their initial position upon the movement of the corresponding screen levers 15, by gravity, to their pendant position. As soon as the plunger shoulder 29 clears the bottom face of the latch bar, the spring 26 of the latter promptly urges the latch bar to its latched position, thereby locking the plunger in its depressed position and the companion screen lever in its elevated or projected position. By this construction, a prompt and quick movement of the screen levers to their projected and pendant positions is attained without overlapping of the changing colors. Furthermore, should one or more of the color screens be in display position and another color screen be desired for selection, upon depressing the actuating plunger 19 of the latter, those previously displayed screens will be automatically released, due to the shifting of the latch bar 24 to its released position upon the depression of the last-named plunger, while the last selected screen will be latched in its projected position. In the event that it is desired to retain any of the previously selected screens in their projected position and still bring on another color screen to effect a desired color effect by a combination of screens, then the operator, when depressing the plunger for the last selected screen, holds the plungers of the other selected screens down, whereby the movement of the latch bar will not effect the release of the plungers and will not allow the movement of the corresponding screen levers to a pendant position.

In order to facilitate the ready application and removal of the color screens or gelatines 13, I provide a clamping ring 31 between which and the ring-like frame 18 of the respective screen lever 15, the color screen is disposed, as shown in Figure 5. The clamping ring 13 is held to the ring frame by a plurality of screws 32 which are screwed into the latter and pass freely through openings 33 in the clamping ring, springs 34 applied to these screws serving to yieldingly urge the clamping ring against the ring frame and thereby effectually holding the color screen or gelatine firmly in place about its marginal edge. As shown in Figures 2 and 5, three clamping screws are provided, two being disposed diametrically opposite each other and the third substantially midway between the same, thereby leaving one side of the ring frame 18 and the clamping ring 31 unobstructed to effect the ready insertion and removal of a screen 13 without necessitating the removal of the clamping ring from the ring-frame. The screws also act to properly gage or position the screens within the frame.

I claim as my invention:—

1. A device of the character described, comprising a casing, a plurality of color-screens pivoted to said casing and disposed side by side for selective movement into and out of an operative position, said screens including integral actuating portions housed within the casing, means guided for vertical movement in said casing for abutting engagement with said actuating portions for individually projecting said screens from a normally inoperative position to an operative position, and means in said casing above the actuating portions of said color screens and governed by said projecting means for latching a selected screen in operative position and for releasing a pre-selected screen to return to its inoperative position.

2. A device of the character described, comprising a box-like casing containing a pivot, a plurality of color-screens projecting from said casing and disposed side by side for swinging movement about said pivot into and out of an operative position, said screens being normally urged by gravity to assume an inoperative position, and having actuating arms in said casing inwardly of the pivot, means independent of the screens for projecting said screens to an operative position including a plurality of plunger-like elements guided for vertical movement in the casing and adapted for engagement with the corresponding actuating arms of the screens, and a latch bar guided for horizontal movement in said casing above its pivot and disposed in operative engagement with said plungers for actuation thereby and for latching one or more of them in position to retain the correspondingly selected screen or screens in operative position and for simultaneously releasing those plungers and screens which had been previously selected.

3. A device of the character described, comprising a casing containing a pivot, a plurality of normally pendant, pivotally-alined, vertically-swinging levers fulcrumed on said pivot and each having at one side of its pivotal-axis a frame adapted to contain a color-screen and at the opposite side thereof with an actuating arm housed within said casing, individual selective means guided for vertical movement in the top wall of the casing and engageable at their lower ends with the companion lever-arms for swinging said levers in a direction to bring their screen-frames to an operative display position, and latch means slidingly mounted in said casing and common to said individual selective means and governed thereby for latching a selected screen in operative position and for simultaneously releasing a pre-selected screen to return it to its inoperative position.

4. A device of the character described, comprising a box-like casing containing a pivot, a plurality of normally pendant, pivotally-alined, vertically-swinging levers fulcrumed on said pivot and each having at one side of its pivotal-axis a frame adapted to contain a color-screen and at the opposite side thereof with an actuating arm housed within said casing, a plurality of depressible plungers independent of said levers and guided for vertical movement in the top wall of the casing for abutting engagement at their lower ends with the companion lever-arm for swinging said levers in a direction to bring their screen-frames to an operative display position, each of said plungers having an upwardly-facing shoulder and a cam surface extending downwardly therefrom, a shiftable latch bar in guiding contact with the inner face of the casing top wall and having openings therein through which said plungers extend and with the edges of which said shoulders are adapted to interlock in the depressed position of the plungers to retain the levers in an operative, screen-displaying position, the cam surfaces of said plungers engaging the opposing edges of the latch bar openings during the depression of a plunger to shift said bar to a position to release any previously selected plunger and companion lever and permit them to return to their normally inoperative pendant position, and means for yieldingly resisting movement of the latch bar out of its normally latched position.

5. In a device of the character described, a substantially circular frame adapted to receive a color-screen, a clamping ring for detachably retaining the screen to said frame, bolts for securing said ring to the frame and disposed clear of the peripheral edge of the color-screen, said bolts being arranged to leave one diametric side of the frame and the ring clear and unobstructed to effect the insertion and removal of the color screen without removing the bolts, and springs applied to said bolts and bearing against the clamping ring for yieldingly urging the latter toward the frame, the bolts constituting abutments against which the peripheral edge of the color-screen bears to center the same in said frame.

6. A device of the character described, comprising a box-like casing having a horizontal pivot therein and a plurality of upright guide slots in its front wall, a plurality of vertically-swinging levers fulcrumed adjacent their inner ends on said pivot and having frames at their outer ends for receiving color screens, said levers projecting through said casing-slots and terminating inwardly of the pivot in actuating arms movable within the casing, a plurality of individually selective plungers guided for vertical movement in the top wall of said casing for engagement at their lower ends with the corresponding lever-arms for projecting the color screen frames to an operative position, and a latch bar disposed within the casing in guiding contact with the underside of its top wall and in operative engagement with said plungers for actuation thereby to releasably latch the plungers in a depressed position and the companion levers in their projected screen-display position.

GEORGE NATHAN.